Feb. 9, 1954     G. T. SKAPERDAS     2,668,425
REMOVING IMPURITIES FROM A GAS LIQUEFACTION SYSTEM
WITH AID OF EXTRANEOUS GAS STREAM
Filed Aug. 25, 1951     2 Sheets-Sheet 1
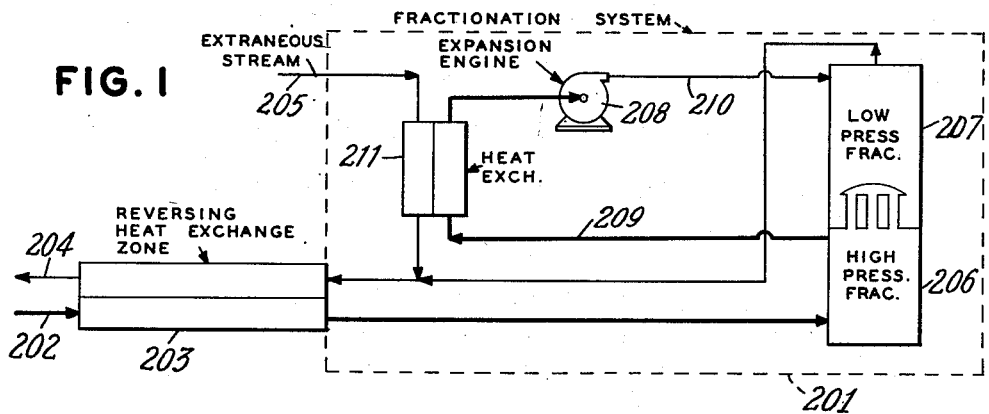
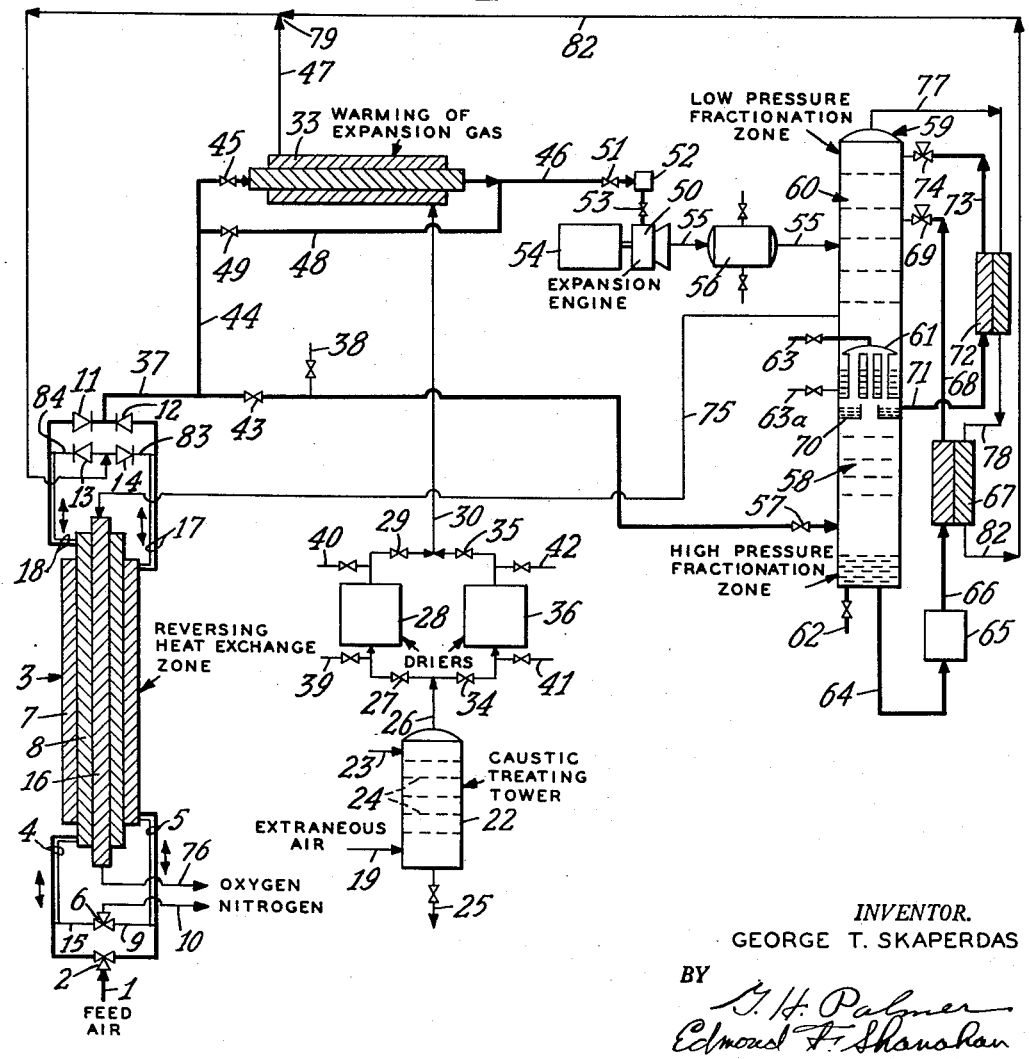
INVENTOR.
GEORGE T. SKAPERDAS
BY
ATTORNEYS

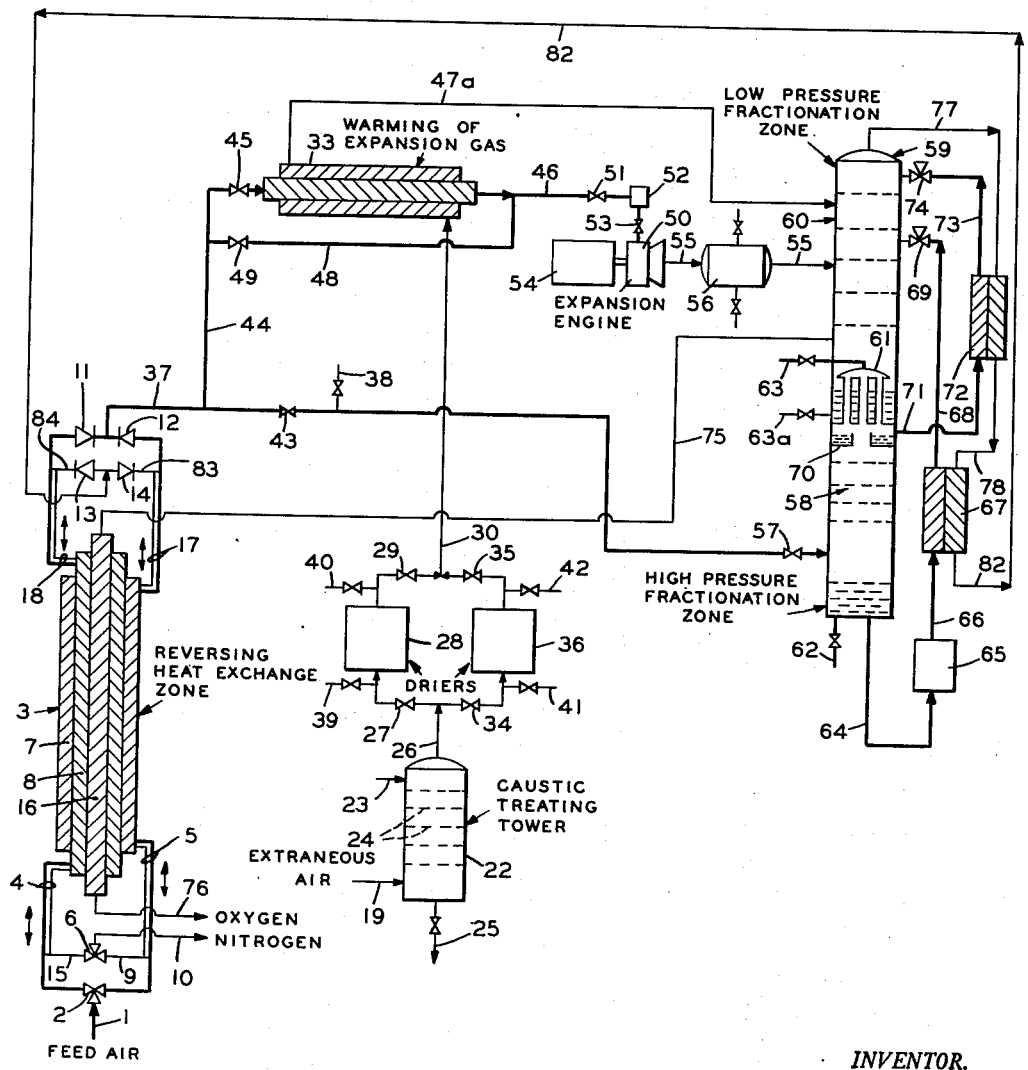

Patented Feb. 9, 1954

2,668,425

UNITED STATES PATENT OFFICE 2,668,425

REMOVING IMPURITIES FROM A GAS LIQUEFACTION SYSTEM WITH AID OF EXTRANEOUS GAS STREAM

George T. Skaperdas, Flushing, N. Y., assignor to The M. W. Kellogg Company, Jersey City, N. J., a corporation of Delaware Application August 25, 1951, Serial No. 243,699

11 Claims. (Cl. 62—175.5)

This application is a continuation-in-part of my copending application Serial No. 734,445, filed March 13, 1947.

The present invention relates generally to processes for fractionating a compressed gaseous mixture in a low-temperature expansion and fractionating system, wherein an inflowing charge stream of said compressed gaseous mixture enters the system at a pre-expansion pressure from a reversing heat exchange zone in which said inflowing stream is cooled, and in a cold part of which high-boiling impurities are precipitated, and wherein an outflowing product stream leaves said system at a post-expansion pressure through said reversing heat exchange zone, absorbing heat and scavenging said precipitated high-boiling impurities by re-evaporization, said inflowing and outflowing streams being flowed countercurrently and alternately with each other through periodically reversing paths in an indirect heat exchange relation in said reversing heat exchange zone.

More particularly, the invention relates to a method for preventing an excessive accumulation of a precipitated impurity in said cold part of the paths of said reversing heat exchange zone during several cycles of operation by introducing into said expansion and fractionating system an extraneous stream of relatively warm gas which enters said fractionating system without passing through said reversing heat exchange zone, but after it leaves said fractionating system does pass through said reversing heat exchange zone, thus increasing the scavenging capacity of said outflowing product stream; the extraneous stream is adjusted to a suitable temperature for introduction into the fractionating system by indirect heat exchange with a stream flowing in said fractionating system under pre-expansion pressure (and hence at generally higher temperatures than most post-expansion streams).

Preferably, the heat content of said extraneous stream is usefully employed to prevent unwanted condensation. The outflowing product stream tends to be so cold that it is capable of causing condensation of inflowing mixture (which is under higher pressure) within said reversing heat exchange zone; such condensation is undesirable in systems not designed especially for it. The extraneous stream slightly warms the outflowing stream (by direct heat exchange) to a temperature at which it does not cause condensation of inflowing compressed gaseous mixture. A second use for the heat is in warming engine-expansion gas. It is customary to expand at least a portion of the gas flowing within a fractionating system under pre-expansion pressure to post-expansion pressure in an expansion engine; heat from the extraneous stream is usefully employed to warm said expansion gas to a temperature sufficiently high so that no part of it will condense into liquid droplets within the expansion engine. (Condensation within an expansion engine is harmful to it.)

The extraneous stream is ordinarily of the same composition as the inflowing stream of compressed gaseous mixture. However, if other gases of suitable physical properties are available, they may be used. Moreover, the extraneous stream may be introduced into the fractionating system at almost any point from which all or part of said stream can find its way out through the reversing heat exchange zone, thus increasing the mass flow rate of the outflowing cold product stream. It will be understood that applicant's invention is concerned with the mass flow rate and temperature of the outflowing cold product stream. It is of no importance, so far as applicant's invention is concerned, whether the "product" content of the outflowing stream is actually increased or not, as long as the total mass flow rate of the stream designated as the "outflowing cold product stream" is increased. For example, if the outflowing stream is nitrogen fractionation product applicant will refer to the "outflowing cold product stream" as being increased by the addition of the extraneous stream even if the extraneous stream contains no nitrogen at all. The term "cold product stream" as used herein, is used to designate a particular stream and not to limit the applicant as to chemical composition since that is quite irrelevant to his process as long as the physical properties of a satisfactory scavenging gas for the system are present.

Gaseous mixtures containing high-boiling impurities, for example, air containing water vapor and carbon dioxide, have been separated in expansion and fractionation systems at low temperatures by compressing the inflowing feed mixture and supplying it to the system through a reversing countercurrent heat exchange zone to precool the mixture by heat exchange with outflowing cold product under lower pressure. A gaseous stream is obtained from a point within the system, for example, by being separated from the precooled mixture subsequent to the heat exchange zone or from a product of a preliminary separation of the mixture in its compressed condition, and expanded with the performance of external work to produce refrigeration necessary to obtain the low temperatures required for liquefaction and fractionation. The expanded stream and at least one other stream from the preliminary separation are introduced into a low pressure zone of fractionation and subjected to fractionation under relatively moderate superatmospheric pressure conditions to provide desired products of separation. At least one of the separated products of the low pressure fractionation is employed as the outflowing cold product to precool inflowing compressed feed gas in the reversing heat exchange zone. During the precooling of the feed gas the high-boiling impurities precipitate and are deposited in the reversing paths of the heat exchange zone. Precipitated deposits are re-evaporated and scavenged by the stream of outflowing cold product which is precooling the compressed feed gas in the reversing paths. Inasmuch as precipitation of high-boiling impurity occurs after the inflowing feed mixture has passed beyond the warm inlet end of the heat exchange zone, that portion of the zone in which alternate precipitation and evaporation takes place is conveniently designated as "the colder portion."

Complete removal of the deposits by the evaporative action of cold product in the reversing paths will be effected only when there is a proper relationship between the rates of mass flow, the temperatures and the pressures of the precipitating and the evaporating gases. A variation of any one of the factors necessarily must be compensated for by a suitable change in another of the factors to readjust the relationship to the proper relationship which provides for complete removal of deposited precipitate in a period. For instance, continued operation of a reversing heat exchange zone without plugging of its reversing passageways requires, for any particular pressure difference between the counterflowing streams, control of the difference between temperatures of the gas precipitating and the gas evaporating a high-boiling impurity in the colder portion to keep these differences below a critical "maximum allowable difference" effective for evaporating the deposited impurity. One method by which such temperature control can be effected is by adjusting the relationship of rates of mass flow of the gases through the reversing paths of the heat exchange zone.

It is an object of the invention to supply an inflowing charge stream of a compressed gaseous mixture to an expansion and fractionating system through a reversing heat exchange zone and cool the inflowing stream in a cold part to a subatmospheric temperature sufficiently low to substantially completely precipitate a high-boiling impurity therefrom.

It is another object of the invention to supply a gaseous mixture to an expansion and fractionating system at pre-expansion pressure through a reversing heat exchange zone and prevent an excessive accumulation of a precipitated high-boiling component of the mixture in a cold part of reversing paths of the zone during several cycles of operation.

It is another object of the invention to supply a compressed gaseous feed mixture at a pre-expansion pressure to an expansion and fractionating system through a reversing heat exchange zone and provide for controlling heat exchange relationship between the feed gas as it precipitates a high-boiling component thereof and a cooling gas as it evaporates precipitated deposits of the high-boiling component by adjusting the relationships between the rates of mass flow of the feed gas and the cooling and scavenging gas through reversing paths of the heat exchange zone.

It is a further object of the invention to supply a cooled gaseous feed mixture to an expansion and fractionating system at a pre-expansion pressure from a reversing heat exchange zone wherein it is cooled in reversing heat exchange relationship by an outflowing product stream at post-expansion pressure and prevent excessive accumulation of a precipitated impurity from the feed gas in a cold part of reversing paths of the heat exchange zone during several cycles of operation by introducing into the expansion and fractionating system an extraneous stream of relatively warm gas which enters the system without passing through the reversing heat exchange zone but after it leaves the expansion and fractionating system passes through the reversing heat exchange zone commingled with the outflowing product stream to increase the evaporating and scavenging capacity of the outflowing product stream.

It is a further object of the invention to adjust the temperature of an outflowing cooling and scavenging product stream from an expansion and fractionating system by employing heat from an extraneous relatively warm stream introduced into the system sufficient to warm the outflowing cooling and scavenging product stream to a temperature at which it does not cause condensation of inflowing compressed feed gas in a reversing heat exchange zone.

It is a still further object to employ heat from an extraneous relatively warm stream, introduced into an expansion and fractionating system to augment an outflowing cooling and scavenging product stream, to warm expansion gas to a temperature sufficiently high so that no part of the gas will condense into liquid droplets during its expansion with the production of external work.

Other objects will be apparent from the following more detailed description of the invention.

In its preferred embodiment, with reference to air as illustrative of a gaseous mixture, the invention involves cooling a compressed stream of air, supplied to an expansion and fractionating system, at a pre-expansion pressure to a relatively low subatmospheric temperature which is below a minimum temperature for effecting vapor phase expansion of the air in a work engine. The air is cooled in a reversing heat exchange zone by passing through paths therein for alternate periods with substantially complete precipitation and deposition of a high-boiling component of the air, such as water vapor and/or carbon dioxide. A cooling and scavenging gaseous stream, for example, a nitrogen-rich stream, is obtained from the system under a post-expansion pressure and passed alternately through paths of the reversing heat exchange zone previously traversed by compressed air to cool the air by indirect heat exchange and to scavenge precipitated deposits from the paths. An extraneous stream of gaseous material, for example, air, under a pressure not substantially greater than that of the cooling and scavenging stream and at a relatively warm temperature, such as atmospheric, is utilized to augment the quantity of the cooling and scavenging stream. In the event, the extraneous stream is air, it is chemically purified and dehydrated before being used. The extraneous stream is cooled before being introduced in the cooling and scavenging gaseous stream by indirect heat exchange relation with a compressed gaseous stream in the gas liquefying and fractionating system. Preferably, the extraneous stream is cooled by employing its heat content to rewarm a portion of the cooled compressed air to be expanded with production of external work to provide for expansion entirely in the vapor phase. The extraneous stream then is introduced into and mixed with the outflowing cooling and scavenging stream prior to its introduction into the reversing heat exchange zone, whereupon the latter stream is warmed enough to prevent any condensation of the compressed stream. The mixing increases the rate of mass flow of the cooling and scavenging stream through the reversing heat exchange zone so that its relationship to the rate of mass flow of the compressed feed air is adjusted sufficiently to make the differences between the temperatures of compressed feed air and counterflowing cooling and scavenging gas in the cold portion of the reversing heat exchange zone less than the maximum allowable temperature difference. In this manner substantially the complete evaporation and removal of precipitated carbon dioxide from the path traversed by the cooling and scavenging stream is effected during each period between any two consecutive alternations in the flow direction of the materials in the reversing paths of the heat exchange zone.

In the following detailed description of the invention, reference will be made to atmospheric air as illustrative of a gaseous mixture in the separation of which the present invention is applicable. It is to be understood however, that the invention is applicable to the separation of other gas mixtures containing an undesirable high-boiling component as, for example, low molecular weight hydrocarbons.

Further explanation of the present invention will be made with reference to the accompanying drawing wherein:

Fig. 1 is a simplified diagrammatic representation of the invention for explanatory purposes.

Fig. 2 of the drawing is a diagrammatical representation of a process flow arrangement for the liquefaction and fractionation of air under relatively moderate superatmospheric pressure to show a modification of the invention according to which an extraneous, or separate, stream of air is chemically purified for removal of carbon dioxide, dehydrated, cooled by indirect heat exchange relation with a compressed gaseous stream in the liquefaction and fractionation system and introduced into the cooling and scavenging gaseous stream prior to introduction of the latter stream into the reversing heat exchange zone. It is to be understood that reference to the figures of the drawing is by way of example only and is not restricted to the physical limitations of the apparatus illustrated therein.

Figure 3 is a diagrammatic representation of a process flow arrangement similar to Figure 2 except that the extraneous air, after cooling, is introduced into the fractionation zone.

An embodiment of the preferred form of applicant's invention is presented diagrammatically in Fig. 1. This figure has been simplified for purposes of explanation, by the elimination of all details well-known to those familiar with the art of separating gaseous mixtures. For example, all the paraphernalia for reversing stream flows, preliminary purification of the extraneous stream, auxiliary heat exchange of various streams within the fractionating system, etc., are deliberately omitted from the diagrammatic representation in order to make it easier to understand. Also, no control or expansion valves are shown. However, streams flowing under relatively high pressure are shown as heavy lines, and streams flowing under relatively low pressure are shown as light lines.

The entire low-temperature fractionating system is represented by the dashed line square indicated by the numeral 201. An inflowing charge stream 202 enters the fractionating system 201 by way of a reversing heat exchange zone 203, which is cooled and scavenged by an outflowing product stream 204, under substantially lower pressure. The fractionating system 201 also receives an extraneous stream of gas 205, ordinarily very small in quantity in relation to the main inflowing stream 202. Of course, there will be various outflowing streams of liquid or gaseous products in addition to the main outflowing stream 204, but these are not shown since they may be withdrawn in a variety of ways well-known to those skilled in the art, as shown in the typical example of Fig. 2.

Within the fractionating system 201, the inflowing compressed gaseous mixture of stream 202 is partially condensed to a liquid. At least part of the mixture must be condensed to a liquid at input pressure but in almost all cases part must remain vaporous and be expanded to a lower pressure, in systems of this type the condensing input vapors must transfer heat by indirect heat exchange to low pressure liquid to boil the latter and effect fractionation. For convenience the pressures within fractionating system 201 or in reversing heat exchange zone 203 can be referred to as either pre-expansion or post-expansion pressures. The pre-expansion pressures are ordinarily about 90 pounds per square inch gage and the post-expansion pressures less than about 15 pounds per square inch gage. The pre-expansion pressures will be in a range of a few pounds required for pressure drop from the point at which the inflowing stream enters to the point at which it is expanded to a post-expansion pressure. Post-expansion pressures will vary within a very small range required to overcome the pressure drop of fluids flowing in the system subsequent to expansion. When it is stated that the extraneous stream is preferably introduced at a "post-expansion pressure" it is meant that the extraneous stream is introduced at a pressure sufficient to cause it to enter a low-pressure part of the fractionating system and flow in the desired direction. The pre-expansion pressures are never more than a few atmospheres, since the system to which applicant's method applies does not rely on the Joule-Thompson effect on the charge gas for obtaining refrigeration. This effect can be relied upon for substantial cooling if charge gas is introduced at pressures of 1000 pounds or more per square inch; but at pressures less than 200 or 300 pounds per square inch, no significant refrigeration is obtained. Because of the advantages of operating in the lower pressure ranges, however, applicant's system deals entirely with processes involving pressures not more than 200 or 300 pounds per square inch. Of course, applicant's invention may be applied to systems of the cascade type, in which auxiliary refrigerants assist in cooling the system, with or without Joule-Thompson effect in the auxiliary refrigerants.

In most systems for fractionating gaseous mixtures, a vertically extended fractionating tower, separated into a lower high-pressure fractionation zone 206 and an upper low-pressure fractionation zone 207 is employed. There is usually heat exchange between the two zones 206 and 207. Each is provided with a series of fractionation trays, and there is a countercurrent contacting of upflowing gases and downflowing liquids, with various sidestreams and product streams entering or leaving each of the fractionation zones.

The expansion of inflowing compressed gaseous mixture, or other streams in the system under pre-expansion pressure, to post-expansion pressure, usually takes place mostly through expansion valves, but it is preferred by applicant, as it is generally in the design of systems for separating gaseous mixtures, to expand at least part of the gas in an expansion engine, an expansion engine being any device by means of which the expansion of the gas produces work, thus effecting marked cooling of the gas. An expansion engine 208 is shown in fractionating system 201. A stream of gas at pre-expansion pressure, 209 is withdrawn from high-pressure fractionation zone 206, expanded in expansion engine 208, and subsequently introduced at post-expansion pressure through line 210 into low-pressure fractionation zone 207. However, it will be understood that all or a portion of the gas for the expansion engine can be obtained from any part of the fractionation system at pre-expansion pressure and not merely from high-pressure fractionation zone 206; for example, a sidestream might be withdrawn for this purpose from inflowing compressed gaseous mixture 202. Also, the outflowing stream of post-expansion gas from expansion engine 208 might be introduced into other suitable parts of fractionation zone 207 or of the fractionation system under post-expansion pressure, besides low-pressure fractionation zone 207.

It is an important feature of the preferred form of applicant's invention that the gas to be expanded in the expansion engine 208 is sufficiently warmed by indirect heat exchange with extraneous stream 205 in heat exchanger 211 so that the gas expanded in the expansion engine remains entirely in the vapor phase and does not condense as liquid, with consequent injury to expansion engine 208.

Extraneous stream 205, having served the purpose of warming compressed gas for expansion engine 208, is now introduced into the outflowing product stream 204 to augment the mass flow thereof and more effectively to scavenge impurities deposited in a cold part of reversing heat exchange zone 203. It will be understood, however, that extraneous stream 205 could be subjected to further heat exchange subsequent to its passage through heat exchanger 211 and/or may be introduced into the low-pressure fractionation zone 207 or other suitable parts of the fractionation system under post-expansion pressure.

The term "fractionating system" is not limited to the high or low pressure fractionation zones, the heat exchangers other than the reversing heat exchange zone, the expansion engine, or other equipment; the term is all inclusive for the entire system except the reversing heat exchange zone itself, and includes all the streams flowing to and from the cold end of reversing heat exchange zone 203a; but the term does not include the extraneous stream prior to cooling or mixing, or any liquid product streams withdrawn from the system without traversing heat exchange zone 203. Fig. 1 does not show any non-reversing product stream (oxygen, for example) outflowing through the reversing heat exchange zone, but these are frequently present and they are included in the fractionating system up to the point at which they begin heat exchange with the reversing streams and are thereafter part of "the outflowing products."

The fractionating system is not limited to those which have both high and low pressure fractionation zones. It includes systems which have only one fractionation zone, which have no bubble trays or rectification, and systems in which the object is primarily liquefaction, and the product stream differs only slightly in composition from the inflowing compressed gaseous mixture.

Referring to Fig. 2 of the drawing, an important function in a process arrangement for separating air is performed by a reversing heat exchanger 3 which provides a zone for precooling compressed feed air supplied to a liquefaction and fractionating system. The inflowing air is precooled by countercurrent heat exchange with cold product streams of oxygen-rich and nitrogen-rich products derived from the air. While the principal function of heat exchanger 3 is precooling the inflowing air stream, this exchanger serves also as a zone of purification. That is, water and carbon dioxide, which are usually present in atmospheric air as impurities, are precipitated from the air at low subatmospheric temperatures to which the air is precooled and are left as deposits on the metallic surfaces of the exchanger. Thus it is not only cooled, but purified air that leaves exchanger 3. Heat exchanger 3 may be constructed in any suitable manner. The drawing shows that it consists of a multi-stream arrangement comprising three passageways for carrying air and the oxygen-rich and nitrogen-rich products. Passageways 7 and 8 of the exchanger, which are similar in flow resistance are "reversing" passageways that alternately carry compressed air and nitrogen-rich product in countercurrent heat exchange with each other. Passageway 16 continuously carries the oxygen-rich product countercurrently to the flow of the compressed air stream and this product stream is in continuous heat exchange relation with both the compressed air and the nitrogen-rich product streams.

Heat exchanger 3 is shown in the drawing to diagrammatically represent a sectional elevation of a multi-annular heat exchanger constructed of concentric annulae surrounding a central tubular passageway. This particular construction of the exchanger is not essential as other forms of construction are equally as applicable to the performance of this apparatus. It is desirable that passageways 7 and 8 which are employed for "reversing," be packed with a metallic material to form extended heat transfer surfaces. Packing material may be of any suitable character and conveniently may consist of a coil of edge wound metallic ribbon, pins, longitudinally placed strips of metal or the like. It is desired also that the metallic packing be affixed to the walls of the passageways with a suitable metal to metal bonding material which may be a suitable solder since it is important to provide an efficient path of thermal flow between all the gaseous streams passing through such heat exchangers. Heat exchanger 3 in the drawing is shown to represent a countercurrent heat exchanger vessel. However it is to be understood that the invention is not limited to an exchanger as the heat exchange zone since it is just as applicable to process arrangements involving the use of regenerative type heat exchange zones and to the use of individual vessels to permit separate exchange of heat between portions of the compressed air with each of the product streams.

In the normal operation of heat exchanger 3, a stream of atmospheric air is introduced under moderate superatmospheric pressure and at a temperature relatively near that of the atmosphere through line 1 and valve 2. This stream is passed to exchanger 3 by way of either line 4 or line 5. For example, the air is compressed to a pressure of the order of magnitude 100 pounds per square inch absolute and is then "after cooled" to a temperature of about 90° F. before being introduced into line 1. To direct the flow of the incoming compressed air alternately into line 4 and line 5 at frequent periodic intervals, for example, periods of about 3–5 minutes' duration, the construction of valve 2 is of the "reversing" type. That is, the valve has a single inlet opening to the flow of the incoming air in line 1 and two outlet openings, one leading into line 4 and the other into line 5. The valve is constructed to direct the inflowing air into either one of the two outlets' connecting lines. Preferably, valve 2 is operated periodically by an automatic timing device, not shown in the drawing, so that the valve settings are automatically changed to divert the feed air alternately into line 4 or line 5 at the desired intervals of time. Reversing valve 6 is mechanically arranged, by means not shown in the drawing, to cooperate simultaneously with the action of valve 2. It is the function of this valve to direct the flow of backward-returning nitrogen-rich product that is also passing alternatively through lines 4 and 5, from these lines into the two outlet openings of valve 6 by way of connecting lines 9 and 15 and through the single outlet opening of the valve into exit line 10.

Before compression of the atmospheric feed air, or at least before the stream of air is drawn into line 1, it is desirable to treat the air to remove impurities such as dust, entrained oil and any condensed water. As a further purifying treatment, it may be desirable to chemically eliminate all traces of acetylene which is usually associated with atmospheric air. This chemical treatment may be accomplished in any desired manner, but conveniently may be performed by subjecting the air to the catalytic action of a suitable catalyst, as for example, one containing a mixture of copper and manganese oxide.

The incoming compressed air passes alternatively from lines 4 and 5 into the warm end of the annular passageways 7 and 8 and in passing through these passageways is cooled in countercurrent flow relation with cold nitrogen-rich product, being passed alternately through the same passageways. Simultaneously, with its exchange of heat with the nitrogen-rich product the compressed air may exchange heat also with the oxygen-rich product which is shown in the present illustration as flowing continuously and countercurrently through passageway 16. As the air is cooled, water, ice and carbon dioxide are precipitated and deposited in the exchanger. Were the flow of air and nitrogen-rich product not interchanged between these passageways, the accumulation of ice and carbon dioxide eventually would plug the exchanger. However, reversing valves 2 and 6 are periodically actuated. This causes the incoming air to be diverted periodically into the alternate passageway which has been carrying the nitrogen-rich product. The change of flow causes check valves 11, 12, 13 and 14 to respond automatically so that the nitrogen-rich product is changed immediately from the passageway which has been carrying it into the passageway which has just been carrying air. The streams of gaseous material in both "reversing" passageways are interchanged periodically by action of the reversing valves but the flow of each stream is always in the same direction. Because these two streams are in counterflow, however, the direction of flow of gas relative to the components deposited in the passageways is reversed upon action of valves 2 and 6 and in consequence of this fact, exchanger 3 is referred to as a "reversing exchanger" and passageways 7 and 8 are designated "reversing passageways."

Inasmuch as the nitrogen-rich product, or "scavenging" stream, is a resultant product of the separation of the air after it has been expanded, this stream is at a lower pressure than the incoming stream of compressed air with which it is exchanging heat in the reversing passageways. Hence, the capacity of the scavenging stream to hold water or carbon dioxide in the vapor state is larger than the capacity of the air stream to do this at the same temperature. Therefore, as the scavenging stream passes over the deposit which the cooling air left in the exchanger, such deposit is evaporated into the nitrogen-rich product stream and carried out of the system. The compressed air, as it leaves passageways 7 and 8 by way of lines 17 and 18 respectively, is in a cold, purified condition and the nitrogen-rich stream becomes saturated with deposited material it has removed from the exchanger. The foregoing cycle of precipitation and evaporation may be repeated indefinitely if the material precipitated in any cycle is evaporated completely in the succeeding cycle.

However, in order to operate reversing exchanger 3 to remove precipitated deposit completely therefrom, it is necessary to establish operating conditions which will ensure complete evaporation of such deposit, otherwise, some deposit will remain after each cycle and will gradually build up until eventually it plugs the exchanger. For a more specific explanation of the deposition and evaporation of the carbon dioxide constituent of air which is a serious cause of plugging reversing exchangers, the process will now be described in connection with a sectional length of a colder portion of one passageway of the exchanger that includes the cold end thereof. The explanation is based upon conditions under which the air is cooled to a sufficiently low temperature that a negligible quantity of the carbon dioxide component leaves the exchanger in the stream of cooled air. In this event, the amount of carbon dioxide brought into and left in this section is determined from the flow rate, the pressure and the temperature of the air as it enters the section because the air flowing into this section necessarily must be saturated with carbon dioxide at its entering temperature. In order for carbon dioxide not to accumulate in the section, the same quantity of this component must be contained in the counterflowing nitrogen-rich stream leaving this same section in the scavenging period. Since the flow rate of this latter stream is known, the actual concentration of carbon dioxide in it may readily be determined for the condition that insures complete evaporation. It is known that for any given concentration of a gaseous component in a gas, and for any given pressure of that gas, there exists a saturation temperature below which the gas cannot contain the given concentration of the gaseous component. This is true with respect to any given concentration of evaporated carbon dioxide held in the vapor phase by the nitrogen-rich product stream as it passes as the "scavenging stream" through the above-mentioned section. Therefore, if the scavenging stream leaving this selected section of the exchanger is colder than the saturation temperature corresponding to the concentration of carbon dioxide determined for the complete evaporation of this component at the pressure of the scavenging stream, this stream will not be able to evaporate completely all of the carbon dioxide deposited by the air in the section in the next preceding period between reversals of valves 2 and 6. The scavenging stream must have a temperature equal to or greater than the saturation temperature established in this manner to ensure complete evaporation in each period.

The difference between the temperature of the compressed air stream entering the sectional length of the exchanger under consideration and the saturation temperature of the scavenging stream leaving this section is a critical value since it is the maximum value for complete evaporation of carbon dioxide. Any operating difference between the temperatures of these streams in excess of this critical value indicates that the scavenging stream is too cold to evaporate the deposit of carbon dioxide completely and, therefore, indicates also that there will be an accumulation of carbon dioxide and an inoperable exchanger because it will "plug up." Temperature differences below this critical value indicate a scavenging stream which is at a temperature warmer than the saturation temperature and which can, therefore, evaporate the carbon dioxide deposit completely. It is understood that in order to allow for factors which affect the actual operation of the exchanger, such as incomplete saturation of the scavenging stream in its passage therethrough, it is desirable to operate with temperature differences somewhat smaller than the critical value. This critical value is defined as the "maximum allowable temperature difference" and in the present explanation is applicable to the point where the compressed air enters the sectional length of the exchanger selected for the exemplification, and to the temperature condition at that point. For other sectional lengths, similar maximum allowable temperature differences may be established corresponding to other temperature conditions. It will be found that the maximum allowable temperature difference decreases in the direction toward the colder portions of the exchanger.

Because the quantity of carbon dioxide that the scavenging stream can evaporate decreases with temperature but increases with decrease in pressure, there are two competing influences involved in the operation of exchanger 3—the difference between the pressures of the counterflowing streams which aids evaporation and the difference between their temperatures which hinders evaporation, the resultant effect of which determines the actual evaporation. In process arrangements, such as is exemplified by Fig. 2, the difference between the pressure of the compressed air and the pressure of the products is determined and fixed by the refrigeration and distillation requirements decided upon and established within fixed limits at the time the process is designed. With one of the competing influences involved in the operation of exchanger 3 thus fixed, it becomes only necessary to operate the reversing streams in heat exchange at temperatures such that the difference between these temperatures is less than the maximum allowable temperature difference to continuously and completely evaporate and remove carbon dioxide deposit in each interval of time between changes in the settings of reversing valves 2 and 6. It is to be understood, that while the foregoing explanation has related to the removal of carbon dioxide only, the principles involved are equally applicable to the precipitation and removal of water or other relatively high-boiling condensable components present in a gas mixture.

The maximum allowable temperature difference establishes the conditions within which the actual operation of reversing heat exchangers are practical for precipitation and evaporation. Such conditions are not necessarily always obtainable as, for example, in the separation of air by the process arrangement shown in the drawing. When reversing exchanger 3 is operated in "balanced flow," the differences between the temperatures of the compressed air and the nitrogen-rich product streams do not remain less than the maximum allowable temperature difference over the whole length of the exchanger. This is because the specific heat of air under a pressure of about 100 pounds per square inch absolute is somewhat larger than the specific heat of air, or of its components, at atmospheric pressure. Furthermore, the difference is somewhat smaller at the temperature of the atmosphere and increases more and more rapidly as the temperature drops. When exchanger 3 is operating in "balanced flow" the rate of mass flow, that is, the flow expressed in terms of weight per unit time, of the compressed air is equal to the sum of the rates of mass flow of the products of the separation. In such balanced heat exchange, the change in temperature of the stream of higher specific heat is smaller than that of the streams of lower specific heat. As a result, because the compressed air has the higher specific heat in exchanger 3, the difference between the temperatures of the reversing streams increases toward the cold end of the exchanger. In consequence of the progressively larger difference in specific heats as the temperature decreases, the difference between the temperatures of the reversing streams progressively increases toward the cold end of the exchanger. This progressive change in temperature difference relationship is of fundamental importance in the operation of the exchanger's reversing passageways 7 and 8 because the difference between the temperature of the streams at the warm end of the exchanger is below the maximum allowable temperature difference for the evaporation of water and ice by the nitrogen-rich product stream. Therefore, the water vapor which has been precipitated during the cooling of the air, either as a liquid or as ice, readily can be completely evaporated during the period between reversals of valves 2 and 6. Toward the cold end of exchanger 3, however, the difference between the temperatures of the compressed air and the nitrogen-rich streams increases to values greater than the critical value required for the complete evaporation of both the carbon dioxide and water in the interval between the reversals of valves 2 and 6 and, therefore, the exchanger will become plugged with solid precipitate. In this manner the change in specific heat causes the difference between the temperatures of the compressed air and nitrogen-rich product streams to increase consistently towards the cold end of the exchanger to values that make the exchanger normally inoperable when it is operating with balanced flow conditions. This inoperable condition is wholly independent of the difference between the temperatures of the streams at the warm end of exchanger 3 because even if this difference were negligible, the difference between the temperatures at the cold end of the exchanger will be in excess of the maximum allowable temperature difference.

According to the present invention, the difference between the temperatures of the compressed air and the nitrogen-rich product streams in exchanger 3 is controlled by employing an extraneous stream of air and injecting this extraneous air at a suitable temperature into the stream of the nitrogen-rich product. This augments the mass of the product stream having the lower specific heat. Then, as a consequence of the larger mass of cold material in countercurrent heat exchange relation with the incoming compressed air, the temperature change of this product stream is smaller for a given temperature change of the compressed air, which, it is noted, is the opposite of the effect resulting from the lower specific heat of the product stream. The difference between the temperatures of the reversing streams toward the cold end of the exchanger is decreased. This temperature differential may be adjusted to any suitable desired difference by regulating the quantity of extraneous air injected into the nitrogen-rich product stream. Pursuant to the process conditions exemplified in the modification of the process arrangement shown by the drawing, exchanger 3 may be operated so that the compressed air leaving the exchanger will have an exit temperature of about —266° F. to provide for the substantially complete precipitation of its carbon dioxide constituent in the exchanger. In this event, the temperature of the nitrogen-rich product stream passing to the exchanger is adjusted to be approximately —271° F. in order that the difference between the temperatures of these counterflowing streams will be less than the maximum allowable temperature difference at the cold end of the exchanger under these operating conditions. To obtain such conditions, atmospheric air, amounting to approximately 3.0 weight per cent of the air passing through line 1, is drawn under a pressure of about 10 pounds per square inch absolute and at a temperature of about 90° F. into line 19 and passed into the bottom of tower 22. The amount of air drawn into line 19 is not a fixed quantity but is dependent upon the actual temperature differences desired along the reversing paths and also must be modified to meet changes in feed air charged; the greater the amount of feed charged, the greater the weight per cent drawn into line 19.

It is the function of tower 22 to chemically remove the carbon dioxide impurity contained in the extraneous air. For this purpose, a caustic solution which conveniently may consist of a 10 per cent solution of potassium or sodium hydroxide, is introduced into the top of tower 22 through line 23. The caustic solution is caused to pass downwardly through the tower over vapor-liquid contacting means which may comprise a plurality of bubble cap trays 24. The spent caustic solution is drawn from the bottom of tower 22 through draw-off line 25. The treated air passes overhead and is taken by way of line 26 through valve 27 into dryer 28 wherein it is contacted with a granular adsorbent material, such as silica gel, or activated alumina, for dehydration. Dried and purified air leaves dryer 28 through valve 29 and is passed by way of line 30, valve 31 being opened, to heat exchanger 33. In heat exchanger 33, at least part of the heat content of the extraneous air is transferred to that part of the cooled compressed air stream diverted from line 37 into line 44 for expansion in expander 50. The heat thus transferred is enough to raise the temperature of this part of the air so that its expansion will be effected in the vapor phase.

In the event it is considered necessary to further dehydrate the stream in line 30, a pair of "switch" heat exchangers, not shown on the drawing, may be employed for use on this line. The stream of air passing through line 30 is circulated through one of the exchangers in a two-phase switch arrangement whereby the air is subcooled sufficiently during one passage to deposit moisture or other condensable material. In its second passage, the air is re-warmed to essentially its previous temperature with the result that the stream passes onward through line 30 at the temperature at which it leaves either dryer 28 or 36 but in a further dehydrated condition.

At infrequent intervals of time, when dryer 28 requires regeneration, valves 27 and 29 are closed and valves 34 and 35 are opened to divert the passage of the air from line 26 into dryer 36. For the regeneration a suitable drying medium is used, which conveniently, may be a portion of cooled compressed air from exchanger 3. This portion is removed from line 37 through the valved line 38, whereafter it may be warmed by any suitable means, such as by an electric heating coil deriving current from generator 54. The warmed portion of the air from line 38 is passed in a single pass flow arrangement into and out of dryer 28 by way of the valved lines 39 and 40 until the bed of granular material is regenerated sufficiently to serve again as a dehydrating adsorbent, the spent drying medium from line 40 being vented from the system. Dryer 36 similarly may be regenerated by passing the warmed air from line 38 into and out of this dryer by way of the valved lines 41 and 42, when valves 34 and 35 are closed and valves 27 and 29 are opened respectively. After regeneration a dryer should be cooled before it is put into service. Cooling may be effected by means of cooled air taken from line 37 through line 38.

The extraneous air, drawn into the system through line 19, is injected into the nitrogen-rich product stream passing to the exchanger in a quantity suitable to adjust the mass of the nitrogen-rich product to provide for the desired maximum allowable temperature difference between the reversing streams at the cold end of exchanger 3. The heat content of the extraneous air stream is always in excess of the heat necessary to warm the quantity of air about to be expanded from the low temperature at which the compressed air leaves exchanger 3 that insures complete precipitation of the carbon dioxide to a temperature sufficiently high so that liquid formation during expansion is obviated. The heat content of the extraneous air in excess of this amount is dissipated into the gas separation system. Conveniently, the excess heat may be dissipated directly into the nitrogen-rich product and thereby bring about a final temperature adjustment of this stream before it is introduced into exchanger 3 so that it will cool inflowing compressed air without formation of liquid droplets. When this expedient is employed, the temperature of the nitrogen-rich product stream is brought to the proper degree for admixture with the extraneous air by heat exchange elsewhere in the system.

Refer now to the cooled compressed air which flows from exchanger 3 by way of either line 17 and check valve 11 or line 18 and check valve 12 into line 37, having valve 43 positioned therein. A portion of the compressed air is diverted from line 37, by controlling the setting of valve 43, and through line 44 and valve 45 to heat exchanger 33. The compressed air diverted from line 37 depends upon the quantity of compressed feed air to be separated which, in the present illustrative example, is about 16 weight per cent. Exchanger 33 preferably is also of the extended surface type and its passageways are packed with a metallic packing material which conveniently may be the same as that used for the packing in exchanger 3. The packing likewise is preferably metal bonded to the walls of the passageways. In the drawing, exchanger 33 also is represented as being constructed with an annular passageway surrounding a central passageway but again this particular construction of the exchanger is not essential as other forms of construction are just as applicable to the performance of this apparatus. The diverted portion of the cooled compressed air enters the central passageway of exchanger 33 at its exit temperature of about −266° F. from exchanger 3 whereupon it flows in countercurrent heat exchange relation with the warm stream of extraneous air from line 30. The resultant effect of this heat exchange is to increase the temperature of the diverted portion to about −239° F. as it leaves exchanger 33 through line 46. Meanwhile, the temperature of the warm stream of extraneous air is reduced from 90° F. to −45° F. as it leaves exchanger 33 through line 47. It is understood, of course, that the heat exchange relation need not necessarily be effected in the exact manner just described since it is just as advantageous to pass the compressed air through the annular passageway and have the extraneous stream of warm air flow through the central tubular passage. In the event it is desired not to pass all of the compressed air in line 44 through exchanger 33, a portion thereof may be transferred from line 44 through line 48, having valve 49, directly into line 46.

The stream of compressed air flowing through line 46 is thus adjusted to the necessary temperature for gaseous phase expansion under the present process conditions. The air enters expander 50 through valve 51, strainer 52 and valve 53. Valve 51 preferably is a solenoid valve which responds to the expander speed so as to prevent over-speeding of the engine. Expander 50 is mechanically connected to run in cooperation with an expander brake 54 which conveniently may be an electrical generator. The compressed air is expanded in the expansion engine from its initial pressure of about 86 pounds per square inch absolute to a pressure of about 24.7 pounds per square inch absolute with the performance of external work. This causes its temperature to be lowered to about −304° F. After expansion the air leaves expander 50 through line 55, having surge drum 56 positioned therein, and is conducted therethrough to the low pressure section of the fractionator.

Return now to the cooled compressed air flowing through line 37. After the aforementioned 16 weight per cent of the air has been withdrawn from this line into line 44, the amount of the air in line 37, after deduction of normal losses in reversing heat exchange plants of this character, represents about 81 weight per cent of the total quantity of air charged to the system. This stream is conveyed through line 37 and pressure control valve 57 into the bottom section 58 of fractionator 59. It is the function of fractionator 59 to separate the now cooled and purified feed air into oxygen-rich and nitrogen-rich products by fractionation and rectification. For this purpose, fractionating tower 59 is separated into two compartments, or sections, 58 and 60. These sections operate at different pressures, the upper section 60 being under the lower pressure and because of this fact the section is termed "the low pressure section" while section 58 is designated as the "high pressure section." Both sections are provided with suitable means for promoting a plurality of intimate vapor-liquid contacts which means may comprise fractionating trays provided with bubble caps. A calandria type heat exchanger 61 is positioned intermediately between the two sections. The calandria has the dual function of serving as the reflux condenser of the higher pressure bottom section 58, and simultaneously serving as the reboiler for the low pressure upper section 60. To allow calandria 61 to serve in its capacity for reboiling and condensing, the operating pressures in the low and high pressure sections are such that the temperature of the condensing vapors in the top of section 58 will be sufficient to transfer heat necessary to boil the liquid bottom product of the low pressure section 60. For this reason, in the present exemplified operation, the pressure in section 58 is held at approximately 86 pounds per square inch absolute while the operating pressure in section 60 is maintained at 24.7 pounds per square inch absolute.

The cooled but vaporous air from line 37 is introduced into section 58 preferably in the vapor space immediately under the bottom tray and the vapors thereof rising through the tower are brought into contact with descending liquid reflux in the trays of the section. In this manner, the air is separated into an oxygen-enriched liquid bottom fraction having a temperature of about −279° F. and into a substantially pure liquid nitrogen top fraction. This top fraction supplies the liquid used for reflux in section 58 as obtained by condensation of the nitrogen vapors at a temperature of about −285° F. in calandria 61 and the liquid nitrogen top reflux for section 60. Valved draw-off lines 62 and 63 are connected to the bottom of section 58 and to the top of calandria 61 respectively for use as draw-off lines in the event it becomes necessary to remove material from this section at these points. The liquefied oxygen-enriched product which collects in the base of section 58 is withdrawn therefrom in a regulated continuous stream through line 64 and thereafter is introduced into filter 65 which contains a body of suitable filtering or absorbing material such as, for example, silica gel or activated carbon. It is the purpose of filter 65 to remove any residual amounts of carbon dioxide or any other impurity, for instance, acetylene which may have penetrated thus far into the system. In the event filter 65 should require revivification this filter may be removed from the line and revivified, the oxygen-rich liquid passing meanwhile through an alternate filter not shown on the drawing. The oxygen-enriched liquid, after the filtration step, is conveyed through line 66 to sub-cooler 67. In sub-cooler 67 the stream of this liquid is cooled further by cold exchange with the nitrogen-rich vapors of the separation to such an extent that when the stream is thereafter taken through line 68 at a temperature of about −285° F. and expanded into the lower pressure section 60 of the fractionator through expansion valve 69, vaporization is minimized.

Simultaneously with the passage of the oxygen-enriched liquid through sub-cooler 67, the liquefied substantially pure nitrogen top product from high pressure section 58 is removed from the top tray 70 of that section at about −285° F. and passed through line 71 to sub-cooler 72. The stream of this liquid product of the primary separation likewise is sub-cooled by the cold vapors of the nitrogen-rich effluent from the top of the low pressure section 60 of the fractionator so that when it is subsequently passed through line 73 at a temperature of about −306° F. and expanded into the top of low pressure section through expansion valve 74, there is not only no excessive flashing but provision for the lowest temperature level for the fractionation. Rectification of the expanded vaporous air from expansion engine 50 and the components of the air expanded through expansion valves 69 and 74 takes place on the vapor-liquid contacting trays in section 60. The liquid bottom product of this rectification is substantially pure oxygen and accumulates at a temperature of about −289° F. in a pool surrounding the tubes of calandria 61. Valved line 63a is connected to the bottom of section 60 for use as a draw-off line for liquefied oxygen. As stated, vaporization of the liquid-oxygen is brought about as the result of condensing nitrogen vapors within the tubes of the calandria to provide the reboiling vapor for section 60 and to supply the product oxygen-rich vapors which are removed from fractionator 59 through line 75 at a point immediately above the level of the pool of liquefied oxygen. These vapors, removed from the fractionator at a temperature of about −289° F., are conveyed by way of line 75 to reversing heat exchanger 3 wherein they are conducted through the inner passageway 16 for countercurrent heat exchange with the incoming compressed air. Having thus given up their recoverable cold content to the incoming stream of air, the vapors of the oxygen-rich product are withdrawn for exchanger 3 by way of line 76 at a temperature of about 83° F.

The nitrogen-rich vapors are taken overhead from fractionator 59 through line 77 at a temperature of about −309° F. and 24.7 pounds per square inch absolute. These vapors are then brought into heat exchange in sub-cooler 72 with the liquefied nitrogen from line 71 whereby the latter has its temperature decreased, as stated, from about −288° F. to about −306° F. while the nitrogen-rich vapors are warmed to about −292° F. At this latter temperature, the nitrogen-rich vapors are immediately passed through line 78 to sub-cooler 67 wherein they are further warmed to about −280° F. by cooling the oxygen-rich liquid from line 66 from about −279° F. to about −286° F. The partially warmed nitrogen-rich vapors then are conveyed through line 82 to the junction point 79 at about −280° F. whereat the vapors become commingled with the cooled extraneous stream of air from line 41. The resultant effect of commingling the two streams is to raise the temperature of the mixed streams to about −271° F. and it is at this temperature that the augmented cooling and scavenging product reaches the cold end of the reversing exchanger 3.

During the time valves 2 and 6 cause the compressed air stream to flow through passageway 8 of exchanger 3 and to leave by way of line 17 and check valve 11, the check valves act to cause the nitrogen-rich vapors to flow through check valve 14, line 83 and line 18 and pass through passageway 7 of reversing exchanger 3. Having been warmed by countercurrent heat exchange with the compressed air in passageway 8 to a temperature of about 83° F., the nitrogen-rich vapors leave the exchanger and the system through lines 5 and 9, reversing valve 6 and line 10. During the opposite operating phase of reversing exchanger 3, that is, when reversing valves 2 and 6 act to cause the compressed air to flow inwardly through passageway 7 and to leave the reversing exchanger by way of line 18 and check valve 12, the check valves act to permit the cold nitrogen-rich vapors to flow from line 82 through check valve 13 and lines 84 and 17 for passage through passageway 8. In this case, the warmed nitrogen-rich vapors leave the system through lines 4 and 15, reversing valve 6 and line 10.

Figure 3 is similar in every respect to Figure 2 except that the extraneous air which is introduced into the system and passed in countercurrent heat exchange with expansion air in heat exchanger 33, is diverted to the low pressure fractionation zone instead of being combined with out-flowing low pressure nitrogen or waste gas. The numbering throughout Figure 3 is exactly the same as that in Figure 2 except that the extraneous air, after having been cooled in exchanger 33, flows by way of line 41a to the low pressure fractionation zone 60.

I claim:

1. In a process for fractionating a compressed gaseous mixture in a low-temperature expansion and fractionating system, wherein an inflowing charge stream of said compressed gaseous mixture enters said system at a pre-expansion pressure from a reversing heat exchange zone in which said inflowing stream is cooled and in a cold part of which high-boiling impurities are precipitated, and wherein an outflowing product stream leaves said system at a post-expansion pressure through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, a method for preventing the excessive accumulation of said precipitated impurity in said cold part of the paths of said reversing heat exchange zone during several cycles of operation, which method includes the steps of: introducing into said system an extraneous stream of relatively warm gas which enters said fractionating system at a post-expansion pressure and without passing through said reversing heat exchange zone; cooling said extraneous stream to a temperature not lower than the temperature of condensation of said inflowing compressed gaseous mixture, by flowing said extraneous stream in indirect heat exchange with a stream flowing in said fractionating system under pre-expansion pressure; and subsequently introducing said extraneous stream into said fractionating system at a point under post-expansion pressure to augment said outflowing stream prior to its passage through said cold part of said reversing heat exchange zone.

2. In a process for fractionating a compressed gaseous mixture in a low-temperature expansion and fractionating system, wherein an inflowing charge stream of said compressed gaseous mixture enters said system at a pre-expansion pressure from a reversing heat exchange zone in which said inflowing stream is cooled and in a cold part of which high-boiling impurities are precipitated, and wherein an outflowing product stream leaves said system at a post-expansion pressure through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, a method for preventing the excessive accumulation of said precipitated impurity in said cold part of the paths of said reversing heat exchange zone during several cycles of operation, which method includes the steps of: introducing into said system an extraneous stream of relatively warm gas which enters said fractionating system at a post-expansion pressure and without passing through said reversing heat exchange zone; cooling said extraneous stream to a temperature not lower than the temperature of condensation of said inflowing compressed gaseous mixture, by flowing said extraneous stream in indirect heat exchange with a stream flowing in said fractionating system under pre-expansion pressure; and subsequently introducing said extraneous stream into said outflowing stream to augment and to slightly warm it prior to its passage through said cold part of said reversing heat exchange zone.

3. In a process for fractionating a compressed gaseous mixture in a low-temperature expansion and fractionating system, wherein an inflowing charge stream of said compressed gaseous mixture enters said system at a pre-expansion pressure from a reversing heat exchange zone in which said inflowing stream is cooled and in a cold part of which high-boiling impurities are precipitated, and wherein an outflowing product stream leaves said system at a post-expansion pressure through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, and wherein at least a portion of the gas flowing within said fractionating system under a pre-expansion pressure is expanded to a post-expansion pressure in an expansion engine, a method for preventing the excessive accumulation of said precipitated impurity in said cold part of the paths of said reversing heat exchange zone during several cycles of operation, which method includes the steps of: introducing into said system an extraneous stream of relatively warm gas which enters said fractionating system at a post-expansion pressure and without passing through said reversing heat exchange zone; flowing said extraneous stream in indirect heat exchange with said engine-expansion portion and warming said portion sufficiently to prevent the formation of liquid within said expansion engine; and subsequently introducing said extraneous stream into said fractionating system at a point under post-expansion pressure to augment said outflowing stream prior to its passage through said cold part of said reversing heat exchange zone.

4. In a process for fractionating a compressed gaseous mixture in a low-temperature expansion and fractionating system, wherein an inflowing charge stream of said compressed gaseous mixture enters said system at a pre-expansion pressure from a reversing heat exchange zone in which said inflowing stream is cooled and in a cold part of which high-boiling impurities are precipitated, and wherein an outflowing product stream leaves said system at a post-expansion pressure through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone; and wherein at least a portion of the gas flowing within said fractionating system under a pre-expansion pressure is expanded to a post-expansion pressure in an expansion engine, a method for preventing the excessive accumulation of said precipitated impurity in said cold part of the paths of said reversing heat exchange zone during several cycles of operation, which method includes the steps of: introducing into said system an extraneous stream of relatively warm gas which enters said fractionating system at a post-expansion pressure and without passing through said reversing heat exchange zone; flowing said extraneous stream in indirect heat exchange with said engine-expansion portion and warming said portion sufficiently to prevent the formation of liquid within said expansion engine; and subsequently introducing said extraneous stream into said outflowing product stream to augment said stream and to slightly warm it prior to its passage through said cold part of said reversing heat exchange zone.

5. In a process for fractionating a compressed gaseous mixture in a low-temperature expansion and fractionating system, wherein an inflowing charge stream of said compressed gaseous mixture enters said system at a pre-expansion pressure from a reversing heat exchange zone in which said inflowing stream is cooled and in a cold part of which high-boiling iimpurities are precipitated, and wherein an outflowing product stream leaves said system at a post-expansion pressure through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, and wherein some gas is fractionated and liquefied in a fractionating zone under pre-expansion pressure and some gas is fractionated and liquefied in a fractionating zone under post-expansion pressure, and wherein at least a portion of the gas flowing within said fractionating system under a pre-expansion pressure is expanded to a post-expansion pressure in an expansion engine, a method for preventing the excessive accumulation of said precipitated impurity in said cold part of the paths of said reversing heat exchange zone during several cycles of operation, which method includes the steps of: introducing into said system an extraneous stream of relatively warm gas which enters said fractionating system at a post-expansion pressure and without passing through said reversing heat exchange zone; flowing said extraneous stream in indirect heat exchange with said engine-expansion portion and warming said portion sufficiently to prevent the formation of liquid within said expansion engine; and subsequently introducing said extraneous stream into said post-expansion fractionating zone to effect an augmentation of said outflowing product stream.

6. In the system for separating a compressed gaseous mixture into output components by liquefaction and fractionation at low temperatures wherein a stream of the gaseous mixture is cooled in a heat exchange zone by a stream of cold output product of the separation, with resultant purification by precipitation of at least one component of higher boiling point in said heat exchange zone, and wherein a second stream of the gaseous mixture is injected into said system at a point subsequent to said heat exchange zone and further wherein a portion of the cooled purified gaseous mixture is subsequently separated for expansion to lower pressure with the performance of external work; the improvement which comprises maintaining a minimum temperature in said heat exchange zone substantially below a temperature necessary for expanding said portion separated for expansion completely in the vapor phase but above the liquefaction temperature of said gaseous mixture to effect the substantially complete precipitation of higher boiling component from the gaseous mixture in the heat exchange zone, maintaining the second stream of the gaseous mixture under a pressure less than that of said first stream, warming said separated portion to a temperature preliminary to expansion by transferring thereto heat from said second stream of the gaseous mixture sufficient to effect vapor phase expansion and produce vaporous products of expansion slightly above liquefaction temperature, and then commingling the thus cooled second stream of the gaseous mixture with said stream of cold output product and passing the commingled streams to said heat exchange zone.

7. The method of fractionating the constituents of a gaseous mixture into product fractions which comprises the steps of cooling a compressed major part of the mixture to slightly above its liquefaction temperature in a path of a reversing heat exchange zone by heat exchange with a cold product fraction of the fractionation passing in another path through said zone countercurrently to the direction of flow of the gaseous mixture therethrough to precipitate an impurity from said mixture and deposit the precipitate in said zone, periodically interchanging the paths of the flow of the mixture and said cold product fraction, separating the compressed major part of the mixture after said precipitation into first and second portions, subjecting the first portion to liquefaction and fractionation, warming the second portion by indirect heat exchange relation with a minor part of the gaseous mixture having a pressure no greater than that of said compressed major part whereby said minor part is partially cooled, expanding the thus warmed second portion completely in the vapor phase and producing expansion products slightly above liquefaction temperature, fractionating said expansion products with products of liquefaction and fractionation of the first portion to provide the cold product fractions of fractionation, adding said partially cooled minor part to one of said product fractions and passing said added minor part and said product fraction through said reversing heat exchange zone as said cold product fraction passing through said periodically interchanging paths whereby said cold product fraction passes over the precipitate and thereby causes the removal thereof.

8. The improvement according to process of claim 7 wherein said gaseous mixture is air, and said cold output product of the separation passing in said reversing paths of said heat exchange zone is predominantly nitrogen.

9. The method of separating a gaseous mixture into output products by liquefaction and fractionation which comprises, cooling the mixture in a compressed state by the refrigeration effect obtained by counter current heat exchange in a reversing heat exchange zone with cold output product material of the separation to eliminate impurities therefrom, separating the purified mixture into first and second portions, further cooling and liquefying the first portion into two fractions, warming the second portion by heat exchange with a relatively small extraneous quantity of the gaseous mixture in a less compressed state, expanding the warmed second portion, fractionating the expanded portion with the two liquid fractions of the first portion to provide the output products of the separation and combining the extraneous quantity of the gaseous mixture with one of said output products.

10. The method of separating a gaseous mixture into output products by liquefaction and fractionation which comprises, cooling the mixture in a compressed state by the refrigeration effect obtained by countercurrent heat exchange in a reversing heat exchange zone with cold output product material of the separation to eliminate impurities therefrom, separating the purified mixture into first and second portions, further cooling and liquefying the first portion into two fractions, warming the second portion by heat exchange with a relatively small extraneous quantity of the gaseous mixture in a less compressed state, expanding the warmed second portion, fractionating the expanded portion with the two liquid fractions of the first portion to provide the output products of the separation, combining the extraneous quantity of the gaseous mixture with one of said output products and then utilizing the refrigerative effect of at least said one of the cold output products of the separation in cooling the compressed gaseous mixture in the reversing heat exchange zone.

11. The method of separating air into nitrogen-rich and oxygen-rich output products by liquefaction and fractionation which comprises, cooling the air in a compressed state by the refrigeration effect obtained by countercurrent heat exchange in a reversing heat exchange zone with at least one of the oxygen-rich and nitrogen-rich output products of the separation to eliminate impurities therefrom, separating the purified air into first and second portions, further cooling and liquefying the first portion into two fractions, warming the second portion by heat exchange with a relatively small extraneous quantity of the air in a less compressed state, expanding the warmed second portion, fractionating the expanded portion with the two liquid fractions of the first portion to provide the oxygen-rich and nitrogen-rich output products, combining the extraneous quantity of the air with one of said output products and then utilizing the refrigerative effect of at least the last-mentioned one of the cold output products in cooling the compressed air in the reversing heat exchange zone.

GEORGE T. SKAPERDAS.

References Cited in the file of this patent

UNITED STATES PATENTS

| Number | Name | Date |
|---|---|---|
| 2,002,941 | Frankl | May 28, 1935 |
| 2,048,076 | Linde | July 21, 1936 |
| 2,433,604 | Dennis | Dec. 30, 1947 |
| 2,504,051 | Scheibel | Apr. 11, 1950 |
| 2,537,044 | Garbo | Jan. 9, 1951 |
| 2,568,223 | De Baufre | Sept. 18, 1951 |
| 2,579,498 | Jenny | Dec. 25, 1951 |
| 2,619,810 | Rice | Dec. 2, 1952 |